(12) United States Patent
Pekarek et al.

(10) Patent No.: US 8,762,917 B2
(45) Date of Patent: Jun. 24, 2014

(54) AUTOMATICALLY MODIFYING A CIRCUIT LAYOUT TO PERFORM ELECTROMAGNETIC SIMULATION

(71) Applicant: AWR Corporation, El Segundo, CA (US)

(72) Inventors: Joseph Edward Pekarek, Manhattan Beach, CA (US); Niranjana Sharma Doddamani, San Jose, CA (US)

(73) Assignee: AWR Corporation, El Segundo, CA (US)

( * ) Notice: Subject to any disclaimer, the term of this patent is extended or adjusted under 35 U.S.C. 154(b) by 0 days.

(21) Appl. No.: 13/723,773

(22) Filed: Dec. 21, 2012

(65) Prior Publication Data

US 2013/0185690 A1    Jul. 18, 2013

Related U.S. Application Data

(63) Continuation of application No. 61/586,513, filed on Jan. 13, 2012.

(51) Int. Cl.
*G06F 17/50* (2006.01)

(52) U.S. Cl.
USPC .......................................................... 716/119

(58) Field of Classification Search
USPC ................................... 716/53, 119
See application file for complete search history.

(56) References Cited

U.S. PATENT DOCUMENTS

| | | | |
|---|---|---|---|
| 5,034,091 A | 7/1991 | Trask et al. | |
| 6,226,781 B1 | 5/2001 | Nistler et al. | |
| 6,434,734 B1 | 8/2002 | Zahar | |
| 6,782,524 B2 | 8/2004 | Rittman | |
| 7,331,023 B2 | 2/2008 | Sercu et al. | |
| 7,496,862 B2 | 2/2009 | Chang et al. | |
| 7,767,495 B2 | 8/2010 | Fuergut et al. | |
| 7,985,517 B2 * | 7/2011 | Tanaka et al. | 430/30 |
| 8,051,400 B2 | 11/2011 | Frederick | |
| 8,086,991 B1 | 12/2011 | Pekarek | |
| 8,158,514 B2 | 4/2012 | Kruger et al. | |
| 8,203,207 B2 | 6/2012 | Getz et al. | |
| 8,209,161 B2 | 6/2012 | Zhu | |
| 8,361,594 B2 | 1/2013 | Gardner et al. | |
| 2004/0243373 A1 * | 12/2004 | Sercu et al. | 703/14 |
| 2012/0221982 A1 * | 8/2012 | Jeong et al. | 716/53 |

OTHER PUBLICATIONS

Pathak et al.; "Automatic Layout Generation of RF Embedded Passive Designs;" IEEE Topical Meeting on Electrical Performance of Electronic Packaging—EPEPS, Oct. 29-31, 2007; pp. 115-118.

"HyperLynx 3D EM: Datasheet;"Mentor Graphics, 2011, retrieved from <http://www.mentor.com/products/pcb-system-design/circuit-simulation/upload/hyperlynx-3d-em.pdf> on Feb. 22, 2013; pp. 1-2.

* cited by examiner

*Primary Examiner* — Thuan Do
*Assistant Examiner* — Mohammed Alam
(74) *Attorney, Agent, or Firm* — Meyertons Hood Kivlin Kowert & Goetzel, P.C.; Jeffrey C. Hood; Mark S. Williams

(57) ABSTRACT

Automatically modifying a layout to perform circuit simulation. Initially, a first layout of the electronic system may be received or stored. A second layout of the electronic system may be automatically generated based on the first layout. The automatic generation may involve automatically simplifying the first layout using a set of rules for electromagnetic (EM) simulation. The second layout may then be used to perform EM simulation of the electronic system, e.g., to perform verification.

20 Claims, 10 Drawing Sheets

AUTOMATICALLY MODIFYING A CIRCUIT LAYOUT TO PERFORM ELECTROMAGNETIC SIMULATION

PRIORITY DATA

This application claims benefit of priority to U.S. Provisional Application Ser. No. 61/586,513, titled "Automatically Modifying a Circuit Layout to Perform Electromagnetic Simulation", filed Jan. 13, 2012, whose Inventors were Joe Pekarek and Niranjana Doddamani, which is hereby incorporated by reference in its entirety as though fully and completely set forth herein.

FIELD OF THE INVENTION

The present invention relates to the field of circuit simulation, and more particularly to a system and method for automatically modifying a circuit layout to perform electromagnetic circuit simulation.

DESCRIPTION OF THE RELATED ART

In recent years, designers of various devices and chips have used a variety of software tools to specify their circuit layouts. In order to allow these designers to quickly assess the efficacy of their designs, there has been a large focus in performing simulations of circuits. However, because of the increasing complexity of the layouts of these circuits, current simulators take an exceedingly long time to perform circuit simulation, such as electromagnetic circuit simulation. Accordingly, designers are typically forced to simplify their designs in order to perform simulation in an efficient manner. Accordingly, improvements in circuit design and simulation are desired.

SUMMARY OF THE INVENTION

Various embodiments of a system and method for automatically modifying a circuit layout to perform electromagnetic circuit simulation are presented below.

Initially, a first layout of an electronic system may be received or stored in a memory. In one embodiment, the first layout may be of a circuit or a circuit board. A user (such as a designer of the electronic system) may wish to perform circuit simulation (e.g., electromagnetic (EM) simulation) of the electronic system, e.g., to verify the design. However, simulation of the first layout may require a great deal of computational resources and/or time and/or the first layout may unnecessarily complex for accurate simulation.

Accordingly, a second layout of the electronic system may be automatically generated and stored based on the first layout. For example, in response to the user requesting simulation of the electronic system, the method may first automatically modify the first layout to generate the second layout, e.g., in order to perform the simulation in a more efficient manner. In some embodiments, the modification of the first layout may include automatically simplifying the first layout using a set of rules for electromagnetic (EM) simulation. For example, the automatic modification may include removing features from the first layout which are unnecessary to perform accurate simulation. As another example, ports in the first layout may be moved from initial positions to different positions, e.g., to enable a simpler, but still accurate, simulation of the electronic system. Other modifications are envisioned and described in more detail below.

In some embodiments, the set of rules used to perform the automatic modification may be specific to a particular generation process or foundry. For example, the electronic system may be intended for fabrication using a particular process or a particular foundry. Accordingly, there may be sets of rules associated with a variety of different processes and/or foundries. Thus, the set of rules used to perform the modification may be selected, e.g., in a manual or automatic fashion. For example, the particular process or foundry may already be associated with the first layout and the method may automatically determine the appropriate set of rules for that process or foundry. Alternatively, or additionally, the user may specify a desired set of rules to perform the modification.

Finally, the second layout may be used to perform the EM simulation. Further, the second layout may be used to verify the electronic system design (e.g., the first layout), e.g., based on the EM simulation.

In further embodiments, the method may include receiving user input modifying the set of rules and then modifying the set of rules in response to the user input. Thus, the user may be able to customize the modification process, e.g., in order to correct for any issues or ensure accurate simulation.

BRIEF DESCRIPTION OF THE DRAWINGS

A better understanding of the present invention can be obtained when the following detailed description of the preferred embodiment is considered in conjunction with the following drawings, in which.

Figure 1:
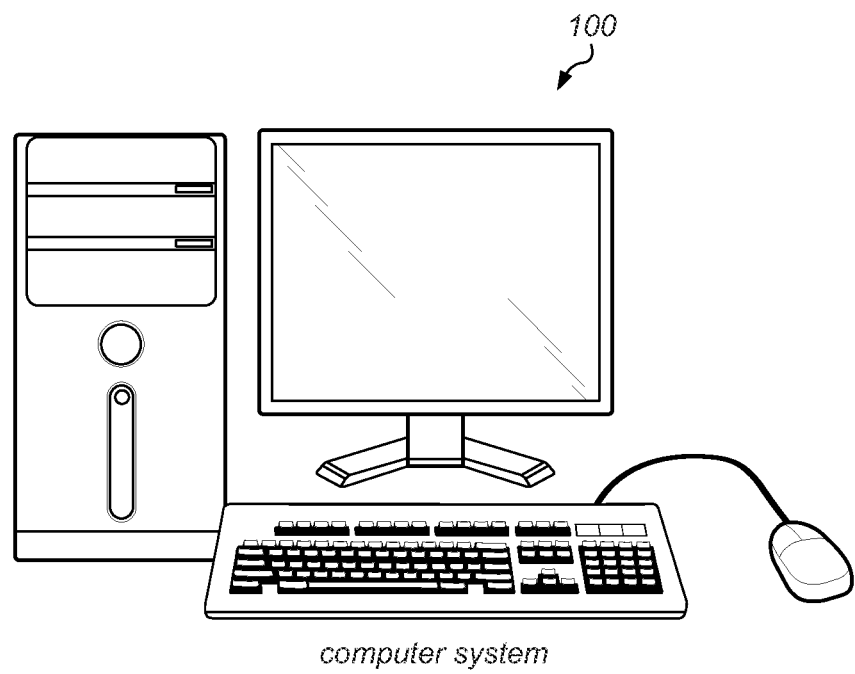
FIG. 1 illustrates a computer system configured to implement embodiments described herein.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference

The following references are hereby incorporated by reference in their entirety as though fully and completely set forth herein:

U.S. Provisional Application Ser. No. 61/586,513, titled "Automatically Modifying a Circuit Layout to Perform Electromagnetic Simulation", filed Jan. 13, 2012.

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Pat. No. 7,210,117 titled "System and Method for Programmatically Generating a Graphical Program in Response to Program Information," filed Dec. 20, 2000.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIG. 1—Exemplary Computer System

FIG. 1 illustrates an exemplary computer system 100 which may be configured to implement embodiments described herein. For example, the computer system 100 may be configured to execute program instructions to automatically modify a circuit layout for performing simulation.

The computer system 100 may include at least one memory medium on which one or more computer programs or software components according to one embodiment of the present invention may be stored. For example, the memory medium may store one or more circuit design and/or simulation programs which are executable to perform the methods described herein. The memory medium may also store operating system software, as well as other software for operation of the computer system. Various embodiments further include receiving or storing instructions and/or data implemented in accordance with the foregoing description upon a carrier medium.

As shown in FIG. 1, the computer system 100 may include a display device configured to display a graphical user interface (GUI) for various programs executing on the computer system 100, such as a circuit design and/or simulation program. The GUI may comprise any type of graphical user interface, e.g., depending on the computing platform.

In some embodiments, the computer system 100 may be coupled to other computer systems over a network. The network can also be any of various types, including a LAN (local area network), WAN (wide area network), the Internet, or an Intranet, among others. The computer system 100 may operate with one or more other computers over the network to perform distributed simulation or design of circuits, as desired.

Figure 2:
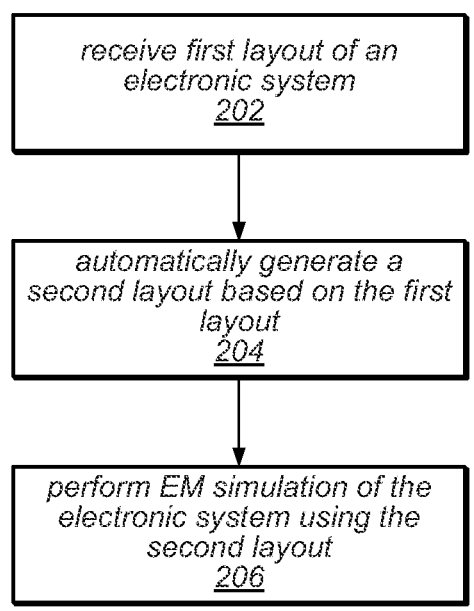
FIG. 2 is a flowchart diagram illustrating one embodiment of a method for automatically modifying a circuit layout.

FIG. 2—Automatically Modifying a Circuit Layout to Perform Simulation

FIG. 2 illustrates a method for automatically modifying a circuit layout to perform simulation. The method shown in FIG. 2 may be used in conjunction with any of the computer systems or devices described herein, among other devices. In various embodiments, some of the method elements shown may be performed concurrently, in a different order than shown, or may be omitted. Additional method elements may also be performed as desired. As shown, this method may operate as follows.

Initially, in 202, a first layout of an electronic system may be received or stored in a memory. In one embodiment, the first layout may be of a circuit or a circuit board. A user (such as a designer of the electronic system) may wish to perform circuit simulation (e.g., electromagnetic (EM) simulation) of the electronic system, e.g., to verify the design. However, simulation of the first layout may require a great deal of computational resources and/or time and/or the first layout may unnecessarily complex for accurate simulation. For example, the initial layout may include details that, when the design is transferred to an EM simulator, take a very long time to simulate.

Accordingly, in 204, a second layout of the electronic system may be automatically generated and stored based on the first layout. This generation may be performed using a set of rules. For example, in response to the user requesting simulation of the electronic system, the method may first automatically modify the first layout to generate the second layout, e.g., in order to perform the simulation in a more efficient manner. In some embodiments, the modification of the first layout may include automatically simplifying the first layout using a set of rules for electromagnetic (EM) simulation. For example, the automatic modification may include removing features from the first layout which are unnecessary to perform accurate simulation. As another example, ports in the first layout may be moved from initial positions to different positions, e.g., to enable a simpler, but still accurate, simulation of the electronic system. In one embodiment, the shape of VIAs may be modified from a circular shape to a rectangular shape, which may be easier to simulate. Similarly, the general shapes of elements or groups of elements in the layout may be simplified (e.g., including several elements having a first complex shape to forming a single element with a simple shape). However, the modification may also include the addition of elements to the first layout, which may allow the simulation to be performed in a more efficient manner. Typically, the net result of the modification will be a reduction in complexity, even if new elements are added to the layout. Thus, the modifications may result in a simpler or more efficient simulation. In one embodiment, every modification may result in a more efficient simulation. Other modifications are envisioned and described in more detail below.

In some embodiments, the set of rules used to perform the automatic modification may be specific to a particular generation process or foundry. For example, the electronic system may be intended for fabrication using a particular process or a particular foundry. Accordingly, there may be sets of rules associated with a variety of different processes and/or foundries. Thus, the set of rules used to perform the modification may be selected, e.g., in a manual or automatic fashion. For example, the particular process or foundry may already be associated with the first layout and the method may automatically determine the appropriate set of rules for that process or foundry. Alternatively, or additionally, the user may specify a desired set of rules to perform the modification.

Finally, in 206, the second layout may be used to perform the EM simulation. Further, the second layout may be used to verify the electronic system design (e.g., the first layout), e.g., based on the EM simulation.

In further embodiments, the method may include receiving user input modifying the set of rules and then modifying the set of rules in response to the user input. Thus, the user may be able to customize the modification process, e.g., in order to correct for any issues or ensure accurate simulation.

FIGS. 3A-8B—Exemplary Figures Corresponding to the Method of FIG. 2

FIGS. 3A-8B are exemplary Figures corresponding to the method of FIG. 2. These Figures and the following descriptions are provided as examples only and are not intended to limit the scope of the descriptions and claims provided herein.

Figure 3A:
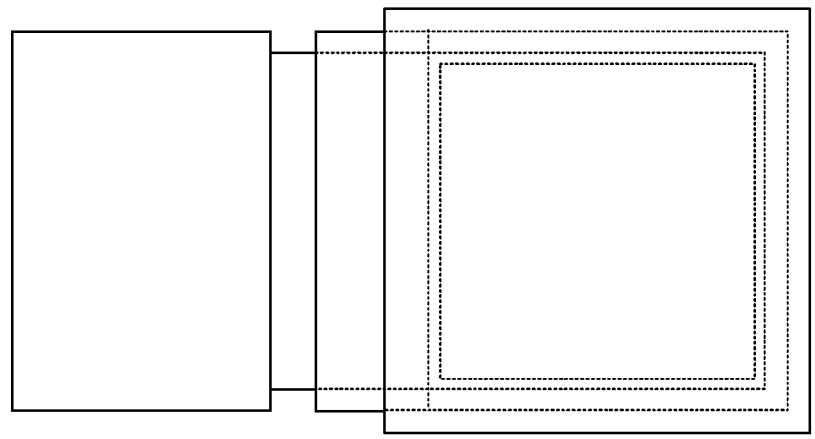
FIGS. 3A-8B are exemplary Figures corresponding to the method of FIG. 2.
Figure 3B:
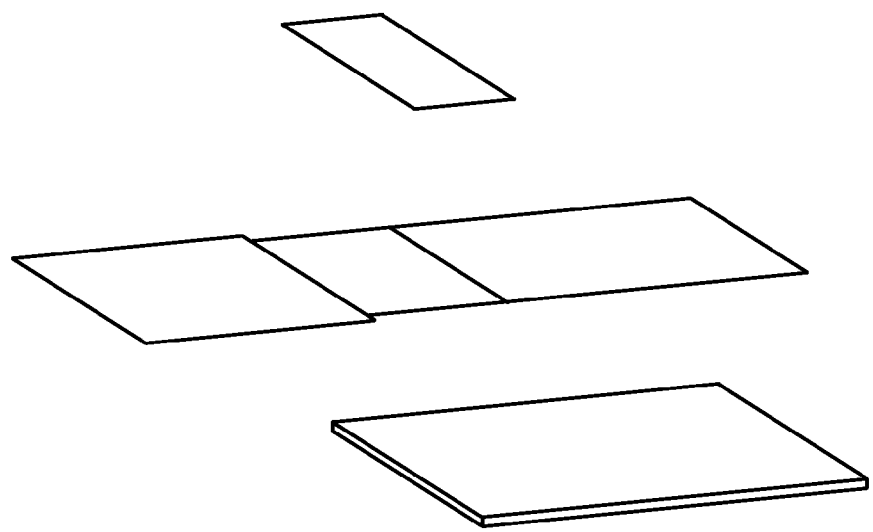
Figure 3C:
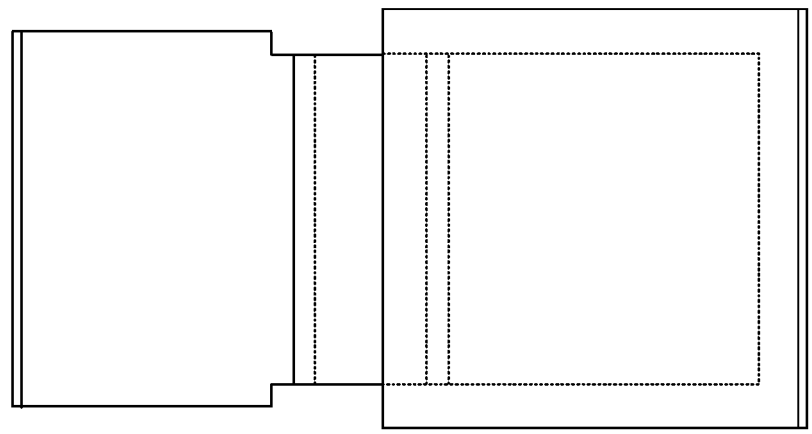
Figure 3D:
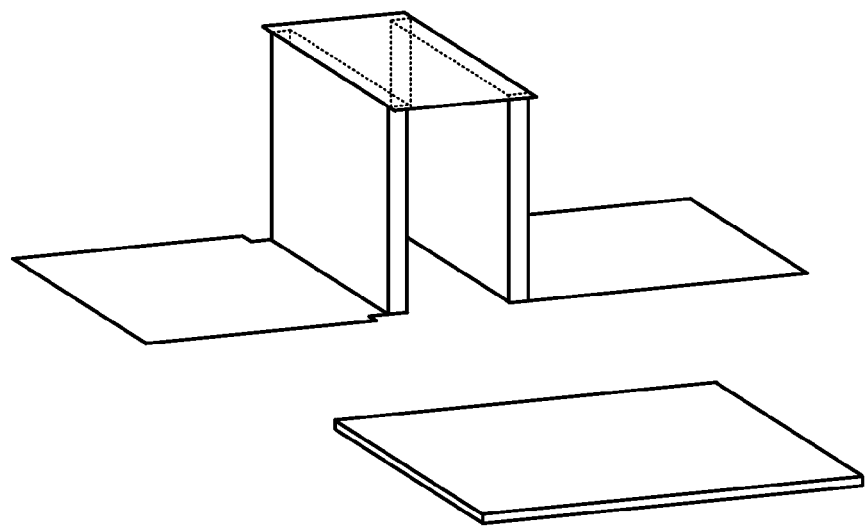

FIGS. 3A and 3B illustrate a flat and three dimensional layout before modification and FIGS. 3C and 3D illustrate a flat and three dimensional after exemplary modification, e.g., using the method of FIG. 2. More specifically, the layout of FIGS. 3A-3D correspond to an airbridge. An airbridge may be created by metal covering some other shape without vias. As shown in these Figures, during modification, an additional shape or element may be added.

In more detail, the complexity of the shapes shown has been simplified after processing, as shown in the differences between FIGS. 3A and 3C. For example, the shapes are more uniform in FIG. 3C. In addition, as shown in the difference between FIGS. 3B and 3D, additional shapes have been added which support the air bridge. More specifically, to simulate the airbridge, the overlap of the metal and airbridge layer need to create an EM layer on a different layer with vias connecting the shapes. These additional shapes are most easily seen by comparing FIGS. 3B and 3D. As shown, among other changes, two additional vertical shapes were added to form the airbridge. These additional Figures may assist in achieving a more efficient simulation.

The rules that achieved this transformation are listed below with comments (indicated by "!"s) above each to indicate their function:
! find the intersection of thick metal and air bridge, place on temporary layer "temp1"
BOOLEAN_OPS "temp1" "Thick Metal" AND "Air Bridge"
! Subtract the resulting shape tempi from thick metal, this will be the new thick metal layer eventually
BOOLEAN_OPS "tmtemp" "Thick Metal" SUBTRACT "temp1"
! resize the boolean and to make room for the vias
RESIZE "temp2" "temp1" 2000
! intersection of oversized air bridge and original thick metal, this maintains the width of the metal but keeps the oversize for the length
BOOLEAN_OPS "temp3" "temp2" AND "Thick Metal"
! intersection of cut out thick metal and new via shape to create vias.
BOOLEAN_OPS "em_der_air_bridge_via" "temp3" AND "tmtemp"
! put new resized air bridge back on air bridge layer
REPLACE "Air Bridge" "temp3"
! put cut out shape for thick metal back on thick metal layer.
REPLACE "Thick Metal" "tmtemp"

FIGS. 4A-4D illustrate a case where the rules may be used to combine many shapes into one of the same size. This example provides one way to handle the platted line case, typically when via(s) of the platted line cannot be resized because the overall thickness of the combined layers is different than when there is no via or because all the layers have different offsets and one of the metals cannot be offset due to capacitors, etc.

Figure 4A:
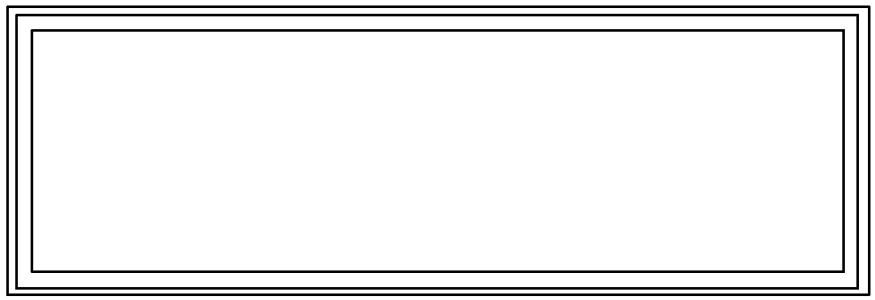
Figure 4B:
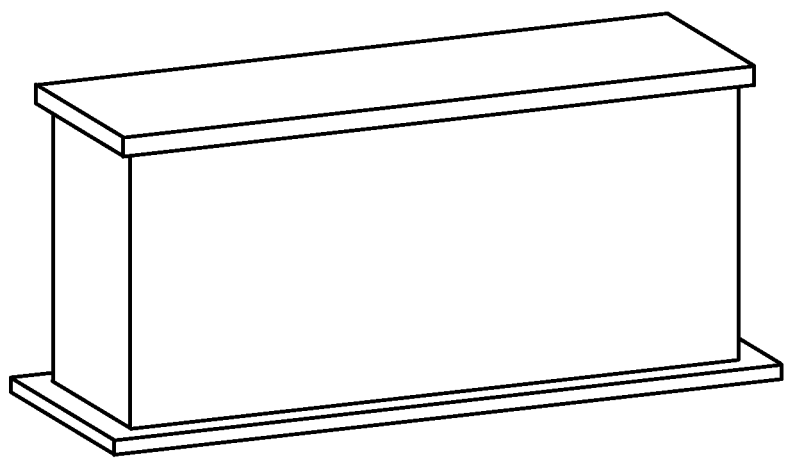
Figure 4C:
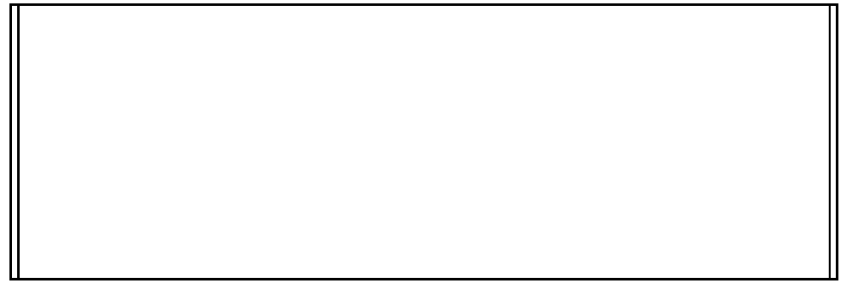
Figure 4D:
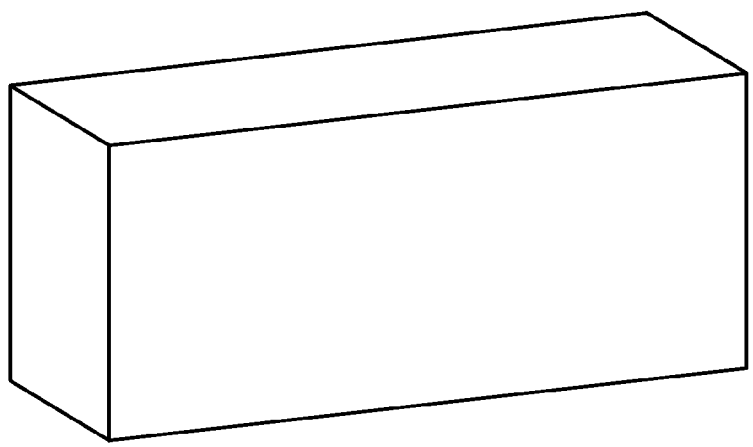

As shown in the differences between FIGS. 4A and 4C, many of the shapes have been removed to generate a simpler shape for simulation. This shape difference is shown more clearly in FIGS. 4B and 4D, where many shapes are reduced to a rectangular prism. More specifically, in this case, the shapes are put on a new layer. The rules that achieved this are listed below with comments above each to say what they do:
! find intersection of Cap Bottom and Nitride Etch, good enough to define a plated line in this case
BOOLEAN_OPS "temp3" "Cap Bottom" AND "Nitride Etch"
! resize this new layer to be the full width of the line, em_thick_metal is a new drawing layer added and is mapped
! now have all the new layer to simulate, just need to remove other shapes at the same locations.
RESIZE "em_thick_metal" "temp3" 3000
! subtract new thick metal shape from cap bottom to new layer
BOOLEAN_OPS "cb_temp" "Cap Bottom" SUBTRACT "em_thick_metal"
! replace new layer with original cap bottom, not needed just for the line, but would need for other structures, caps, etc.
REPLACE "Cap Bottom" "cb_temp"

! repeat the subtract and replace for the next two lines for the original plated line.
BOOLEAN_OPS "ne_temp" "Nitride Etch" SUBTRACT "em_thick_metal"
REPLACE "Nitride Etch" "ne_temp"
BOOLEAN_OPS "tm_temp" "Thick Metal" SUBTRACT "em_thick_metal"
REPLACE "Thick Metal" "tm_temp"

Figure 5A:
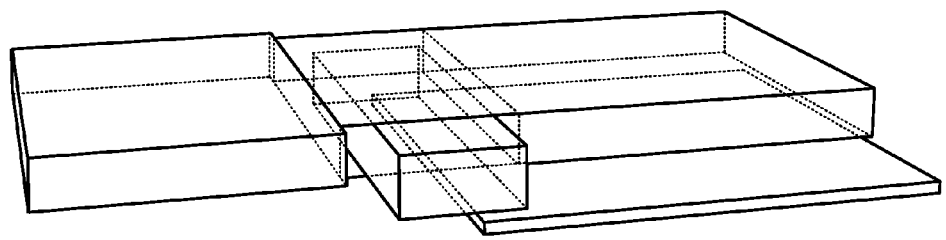
Figure 5B:
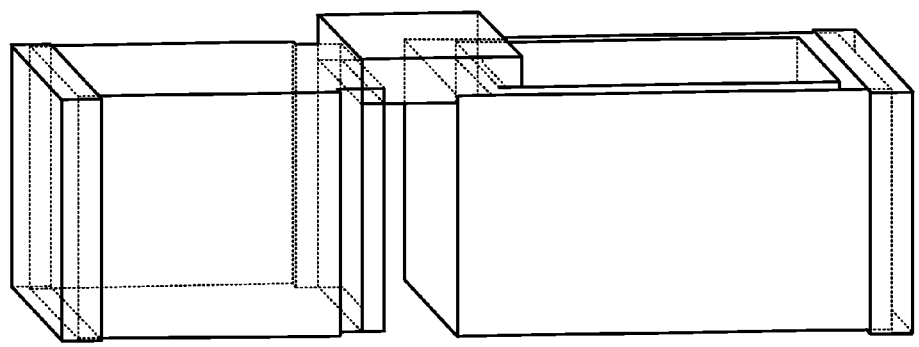

FIGS. 5A and 5B illustrate exemplary before and after 3D models using an exemplary set of rules. As shown in these Figures, the initial set of shapes have been altered significantly to the second set of shapes, including shape removal, addition, size change, etc.

Figure 6A:
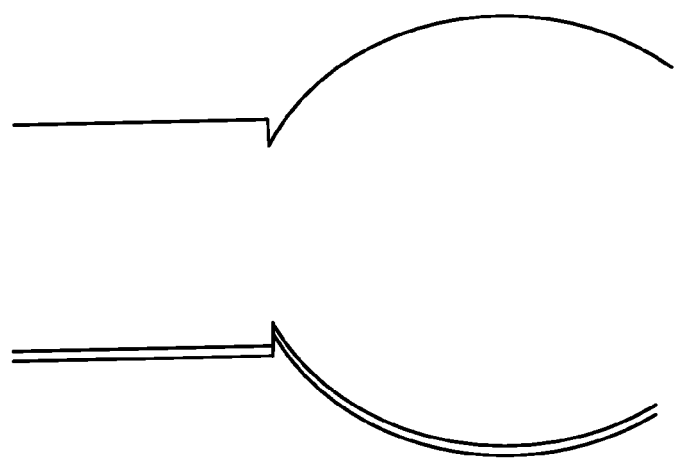
Figure 6B:
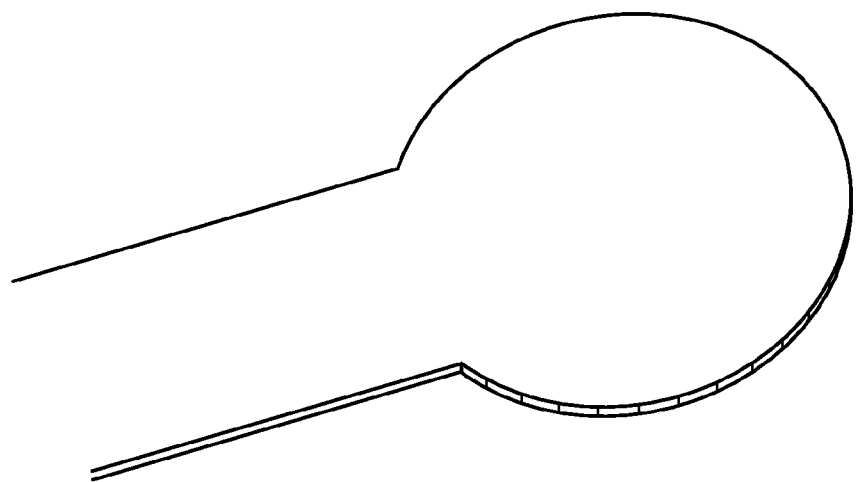

FIGS. 6A and 6B illustrate exemplary before and after 3D models using an exemplary set of rules. As shown in these Figures, the initial layout includes two distinct shapes, a rectangular prism and a cylindrical prism which overlap. As shown in FIG. 6A, these two shapes do not form a continuous shape, and create an uneven edge at the overlap. In FIG. 6B, these shapes have been joined together into a continuous shape without the jagged edges of FIG. 6A. Accordingly, EM simulation will not have to deal with more than one shape having uneven edge effects using the layout of FIG. 6B.

Figure 7A:
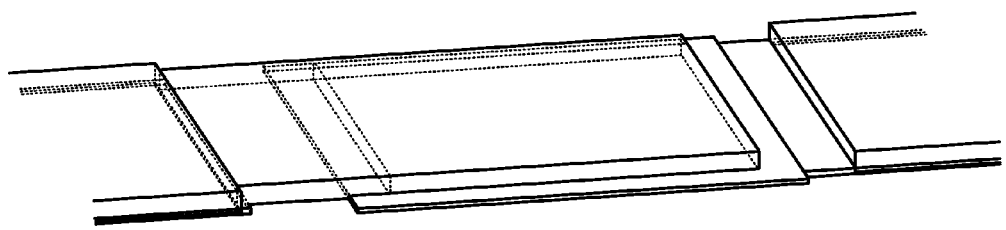
Figure 7B:
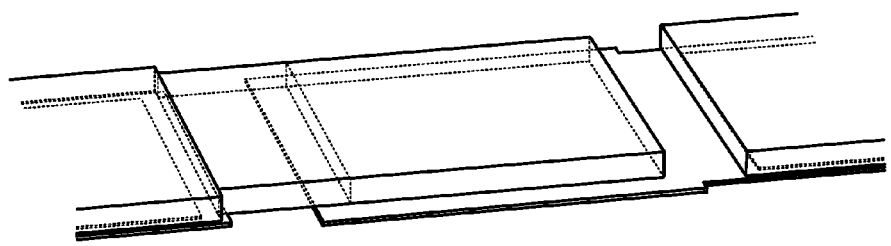

FIGS. 7A and 7B illustrate exemplary before and after 3D models using an exemplary set of rules. As shown in these Figures, interior shapes (within the exterior rectangular prisms) have been removed in order to simplify EM simulation.

Figure 8A:
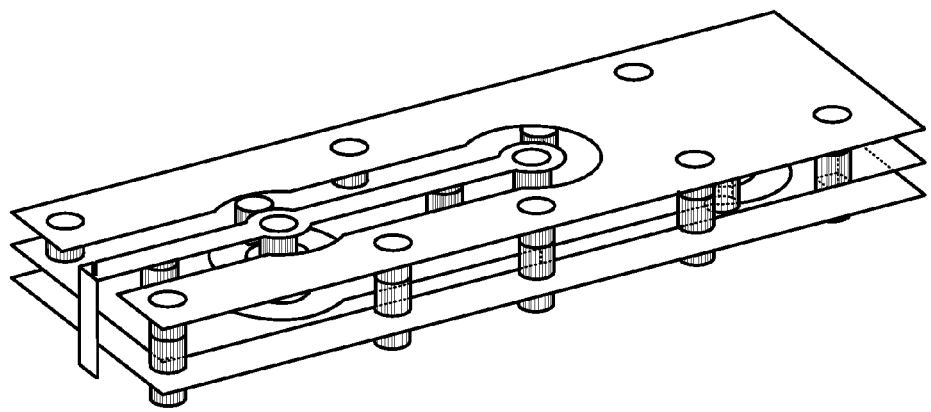
Figure 8B:
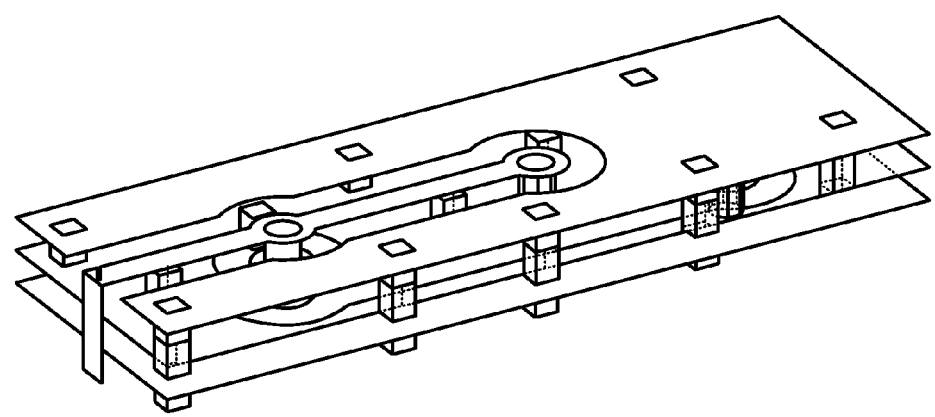

FIGS. 8A and 8B illustrate exemplary before and after 3D models using an exemplary set of rules. In this particular example, the more complex circular VIAs in FIG. 8A have been simplified into rectangular prisms in FIG. 8B, which may greatly reduce the time required to perform EM simulation.

In addition to the Figures described above, the rules may include a port moving algorithm. More specifically, when modifying shapes, ports can be in different locations. The following is the algorithm of how this might work if the Move_Port rule is not used.

1) Search for shapes on (x1, y1, z) coordinate of the port (e.g., the shape should contain this coordinate), e.g., with layer restricted to original EM layer (not drawing layer)
2) If no shapes found, search on (x2, y2, z) coordinate of the port, e.g., with layer restricted to original EM layer
3) Two searches may now be conducted within these shapes for edges to attach the port:
  a. Search along the perpendicular unit vector of the port, attach to nearest edge if found
  b. If not found, search along the parallel UV and attach to nearest
  c. If during any of these searches an edge with exact fit (x1, y1, x2, y2, and z) is found, attach to it (this could be a different EM layer but same z location).
4) If still no edge is found do a, b, c with no restriction on layer or z.
The priority may be given by:
1) Exact matching edge (x1, y1, x2, y2, z)
2) Nearest along perpendicular UV with same layer as long as shape contains x1, y1 or x2, y2 and same z
3) Nearest along parallel UV with same layer as long as shape contains x1, y1 or x2, y2 and same z
4) Nearest along perpendicular UV
5) Nearest along parallel UV
However, if the MOVE_PORT rule is used, the following algorithm may be used:

1) Search for shapes on (x1, y1, z) coordinate of the port (e.g., the shape should contain this coordinate), with layer restricted to a new EM layer.
2) If no shapes found, search on (x2, y2, z) coordinate of the port, with layer restricted to a new EM layer Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for automatically modifying an electronic system, comprising:
  storing a first layout of the electronic system in a memory;
  automatically generating a second layout of the electronic system based on the first layout, wherein said automatically generating the second layout comprises automatically modifying the first layout in accordance with a set of rules that specify requirements for electromagnetic (EM) simulation; and
  storing the second layout of the electronic system in the memory, wherein the second layout is usable to perform the EM simulation of the electronic system, wherein EM simulation of the electronic system per the second layout is simpler than EM simulation of the electronic system per the first layout.

2. The method of claim 1, further comprising:
  performing EM simulation of the electronic system using the second layout.

3. The method of claim 2, further comprising:
  verifying the electronic system based on said performing the EM simulation.

4. The method of claim 1, wherein said automatically generating the second layout of the electronic system comprises automatically removing features of the first layout.

5. The method of claim 1, wherein said automatically generating the second layout of the electronic system comprises automatically moving one or more ports from first locations in the first layout to second, different, locations in the second layout.

6. The method of claim 1, further comprising:
  receiving user input to modify the set of rules; and
  modifying the set of rules in response to the user input.

7. The method of claim 1, wherein the set of rules are selecting from a plurality of sets of rules, wherein the method further comprises:
  selecting the set of rules from the plurality of sets of rules.

8. The method of claim 7, wherein the first layout is associated with a first foundry, wherein the set of rules is associated with the first foundry, wherein said selecting the set of rules is based on the first layout and the set of rules being associated with the first foundry.

9. The method of claim 7, wherein the first layout is associated with a first circuit creation process, wherein the set of rules is associated with the first circuit creation process, wherein said selecting the set of rules is based on the first layout and the set of rules being associated with the first circuit creation process.

10. The method of claim 1, wherein the electronic system comprises a circuit or a circuit board.

11. A non-transitory computer accessible memory medium storing program instructions for a automatically modifying a layout of an electronic system, wherein the program instructions are executable to:
  receive a first layout of the electronic system;

automatically generate a second layout of the electronic system based on the first layout, wherein said automatically generating the second layout comprises automatically modifying the first layout in accordance with a set of rules that specify requirements for electromagnetic (EM) simulation; and store the second layout of the electronic system, wherein the second layout is usable to perform EM simulation of the electronic system, wherein EM simulation of the electronic system per the second layout is simpler than EM simulation of the electronic system per the first layout.

12. The non-transitory computer accessible memory medium of claim 11, wherein the program instructions are further executable to:

perform EM simulation of the electronic system using the second layout.

13. The non-transitory computer accessible memory medium of claim 12, wherein the program instructions are further executable to:

verify the electronic system based on said performing the EM simulation.

14. The non-transitory computer accessible memory medium of claim 11, wherein said automatically generating the second layout of the electronic system comprises automatically removing features of the first layout.

15. The non-transitory computer accessible memory medium of claim 11, wherein said automatically generating the second layout of the electronic system comprises automatically moving one or more ports from first locations in the first layout to second, different, locations in the second layout.

16. The non-transitory computer accessible memory medium of claim 11, wherein the program instructions are further executable to:

receive user input to modify the set of rules; and
modify the set of rules in response to the user input.

17. The non-transitory computer accessible memory medium of claim 11, wherein the set of rules are selecting from a plurality of sets of rules, wherein the program instructions are further executable to:

select the set of rules from the plurality of sets of rules.

18. The non-transitory computer accessible memory medium of claim 17, wherein the first layout is associated with a first foundry, wherein the set of rules is associated with the first foundry, wherein said selecting the set of rules is based on the first layout and the set of rules being associated with the first foundry.

19. The non-transitory computer accessible memory medium of claim 17, wherein the first layout is associated with a first circuit creation process, wherein the set of rules is associated with the first circuit creation process, wherein said selecting the set of rules is based on the first layout and the set of rules being associated with the first circuit creation process.

20. The non-transitory, computer accessible memory medium of claim 11, wherein the electronic system comprises a circuit or a circuit board.

* * * * *